United States Patent [19]

Bjödstrup

[11] 4,220,060

[45] Sep. 2, 1980

[54] TOOL FOR DEBURRING TUBES OF DIFFERENT WIDTH

[76] Inventor: Ole J. Bjödstrup, Vildrosvägen 19, S-574 00 Vetlanda 2, Sweden

[21] Appl. No.: 15,008

[22] Filed: Feb. 26, 1979

[51] Int. Cl.$^2$ .......................... B23B 3/22; B23B 51/00
[52] U.S. Cl. ....................................... 82/4 C; 408/191
[58] Field of Search ................. 82/4 C; 408/147, 153, 408/154, 157, 168, 169, 191, 196, 202, 203.5

[56] References Cited

U.S. PATENT DOCUMENTS

| | | | |
|---|---|---|---|
| 1,499,416 | 7/1924 | Stech | 408/191 |
| 3,091,145 | 5/1963 | Manganelli | 82/4 C X |
| 3,280,672 | 10/1966 | Riedel | 82/4 C |
| 3,875,832 | 4/1975 | Mayfield | 82/4 C |
| 4,114,484 | 9/1978 | Feamster | 82/4 C |

Primary Examiner—Harrison L. Hinson

Attorney, Agent, or Firm—Hubbell, Cohen, Stiefel & Gross

[57] ABSTRACT

A tool for deburring tubes of different diameters comprises means for securing the tool in a lathe or another rotor machine, a holder united with said tool securing means and holding a number of cutters, and a guide stud, which is substantially coaxial with the holder and the tool securing means and comprises a substantially conical portion which faces away from said tool securing means and is intended to center the tube to become deburred with respect to said cutter holder. The cutters have deburring edges, which face away from the tool securing means and are located in grooves in the holder. The cutters and the guide stud are elastically movable with respect to each other under the influence of spring means to hereby automatically adjust the location of the cutting edges of the tool to the diameter of the tube or bushing to become deburred.

7 Claims, 4 Drawing Figures

TOOL FOR DEBURRING TUBES OF DIFFERENT WIDTH

FIELD OF THE INVENTION

The invention relates to a deburring tool, i.e., a tool for removing burrs from the ends of tubes or bushings.

DESCRIPTION OF THE PRIOR ART

In this field of the art there are known tools for deburring tubes of different width which comprise means for securing the tool in a rotor machine, a holder connected to said tool securing means and holding a number of cutters located in grooves in said holder and having deburring edges, which face away from said tool securing means, and a guide stud, which is substantially coaxial with said holder and said tool securing means and comprises a substantially conical portion for centering the tube to become deburred with respect to said cutter holder, said conical portion facing away from said tool securing means. Deburring tools of this general kind are disclosed in the U.S. patent specification 1 204 994 and the German patent application publications (DE-OS) 1 402 898 and 2 617 724.

SUMMARY OF THE INVENTION

The primary object of the invention is to provide a deburring tool of the abovementioned kind which automatically adjusts itself to the tube or bushing to become deburred in dependence of its width or diameter.

This object is attained thanks to the fact that the cutters and the guide stud of the deburring tool according to the invention are elastically movable with respect to each other under the influence of spring means. With a deburring tool of this novel design it is possible to deburr tubes of different diameters without having to remove the tool from the rotor machine in which it is clamped or secured.

In one advantageous embodiment of the invention the position of the guide stud in the axial direction with respect to said cutter holder is adjustable beforehand.

Further features and advantages of the deburring tool according to the invention will become apparent from the following detailed description and the annexed drawings, which diagrammatically and an non-limiting example illustrate a preferred embodiment of the invention.

Figure 1:
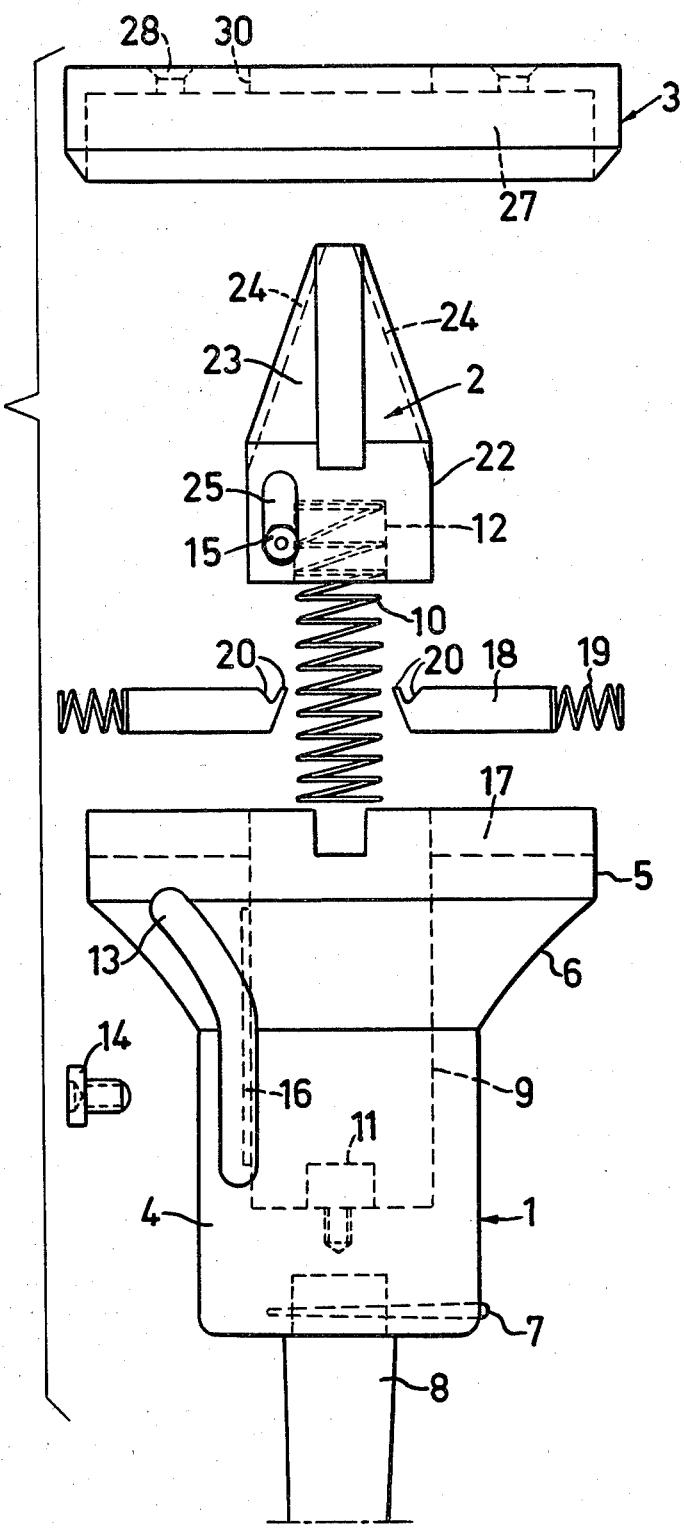
FIG. 1 is an exploded plan view of the deburring tool according to the invention.
Figure 2:
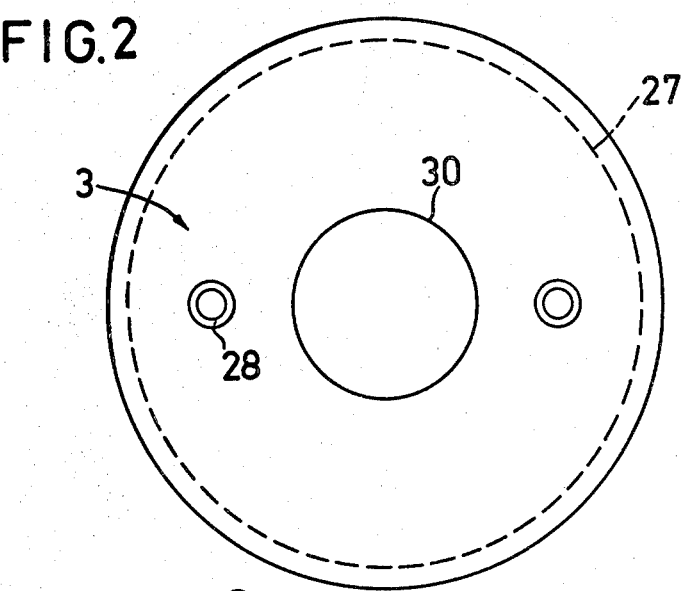
FIG. 2 is a plan view of a cap comprised in the tool.
Figure 3:
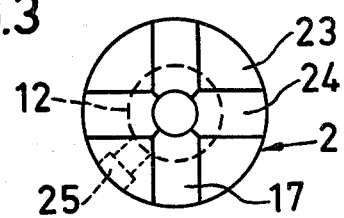
FIG. 3 is a plan view of a guide stud which is also comprised in the deburring tool.
Figure 4:
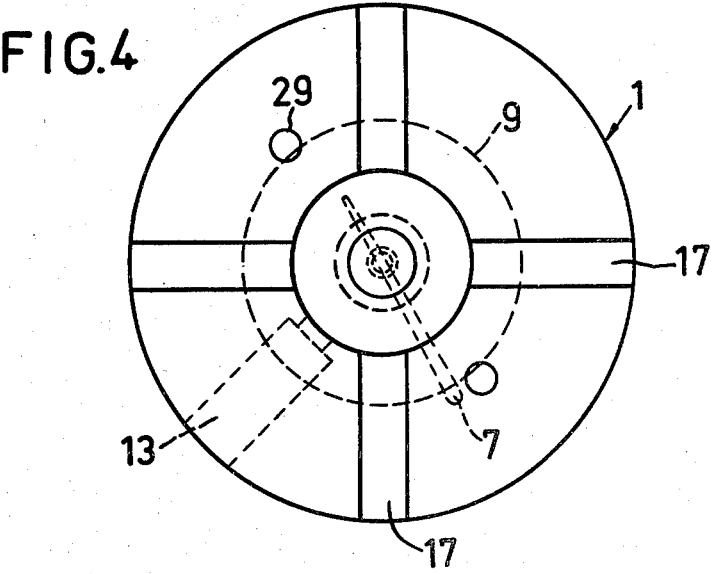
FIG. 4 is a plan view of a holder for the cutters and the guide stud, said holder also being comprised in the deburring tool.

The principal parts of the deburring tool in accordance with the invention are a holder 1, a guide stud 2 and a cap 3.

The holder 1, which compises two substantially cylindrical portions 4 and 5 and an intermediate, substantially truncated conical portion 6, which interconnects the two cylindrical portions 4, 5, is at its one end rigidly connected, e.g. by means of a pin 7, with a securing means in the shape of a cone 8 of standard type, which can be clamped in a drilling machine, a mill, a lathe or the like. The holder 1 further comprises a central dead end hole 9, which opens into the end of the holder which is remote from the securing means 8. This end is plane and substantially perpendicular to the rotational axis of the holder 1. The dead end hole 9 is adapted to house the guide stud 2 and a compression spring 10, which is adapted to bias the guide stud 2 in the direction out of the hole 9 and which is guided by a stud 11 in the bottom of the hole and by a recess 12 in the base end of the guide stud 2 which faces the hole.

In its envelope or outer surface the holder 1 is provided with a groove 13, which extends in the conical portion 6 as well in the cylindrical portion 4 and through which an adjustment screw 14 is available, which is displaceably secured in a thinned portion 16 of the tube wall of the holder 1 by means of an associated nut 15. The screw 14 and the nut 15 which together form an adjustment means are jointly displaceable and lockable in the groove 13 for determining the desired "home position" of the guide stud 22 in depenence of the diameter of the tube to become deburred.

In the plane end surface of the holder 1 which faces away from the securing means there are provided four grooves 17 which are open axially and open also toward the dead end hole 9 as well as toward the envelope surface of the cylindrical portion 5 in their radially outer ends. Inserted in each groove 17 are a cutter 18 and a compression spring 19 which biases the cutter radially inwards. The cutters 18 are preferably made of hard metal, high-speed steel and have deburring edges 20, which in the preferred and illustrated embodiment are so designed that they smooth the end surface of the tubes and deburr the tubes internally as well externally in one and the same operation.

The above-mentioned guide stud 2 which suitably is made of hardened steel has an inner, substantially circular-cylindrical portion 22 which is located in the dead end hole 9 inside the cutters 18, substantially in its entirety, when the deburring tool is mounted and has an outer, substantially conical portion 23 which projects more or less far beyound the cutters 18 in the axial direction. The conical portion 23 is provided with four grooves 24 which are each located just opposite one individual one of the grooves 17 of the holder 1. Each of the grooves 24 extends along a generatrix of the conical portion 23 and is engaged by the edges 20 of the cutters under the influence of the pressure from the springs 19 against the opposite outer ends of the cutters. The distance between the deburring edges 20 of two diammetrically located cutters 18, which corresponds to the diameter of the tube or bushing to become deburred, is thus directly dependent of the position of the conical portion 23 in the axial direction with respect to the cutters 18. This position is determined by a groove 25 which is provided in the envelope surface of the cylindrical portion 22 and extends in the axial direction.

In engagement with this groove is the above-mentioned adjustment screw 14 and/or its associated nut 15 which are illustrated substantially in their "home position" at the axially inner end of the groove 25 in FIG. 1, which corresponds to the largest presupposed tube diameter.

The cutters 18 and their springs 19 as well as the guide stud 2 and its spring 10 are maintained at their places in the grooves 17 and the dead end hole 9 in the holder 1, respectively, by the cap 3, which like the holder 1 preferably is made of ordinary steel and in the mounted condition of the tool encloses the envelope surface of the cylindrical portion 5 which is located in a recess 27 in the cap 3 in said condition. The cap is attached to the holder 1 by means of screws (not shown) which pass through countersunk screw holes 28 in the cap 3 and are threaded into threaded screw holes 29 in the holder 1. The cap 3 has a central hole 30, through which a greater or smaller portion of the conical portion 23 projects.

When it is desired to deburr a tube, the cone 18 or a corresponding means is clamped in a lathe chuck, a drilling machine or the like and is rotated. The tube end is then pressed by hand against the conical surface 23 of the guide stud 2, so that the guide stud and the tube end are axially displaced until the cutting edges 20 of the cutter engage the tube end which will then become deburred internally and externally as well as smoothed or finished in one and the same operation. The edges 20 slide in the grooves 24 of the guide stud 2 under the influence of the spring 19 simultaneously as the screw 14 and/or the nut 15 slides in the groove 25. When these elements are located in the axially outer end of the groove 25 this corresponds to the deburring of a tube with a minimum diameter within the present range of operation. The maximum axial displacement of the guide stud is thus determined by the length of the groove 20 which defines the minimum and maximum tube diameters corresponding to the present range of operation. It is obvious that the diameter or operation range set can be varied with respect to the dimension of the maximum diameter corresponding to the "home position" by displacing the screw 14 and the nut 15 in the groove 13. This may be carried out while the deburring tool remains clamped in the rotor machine. Hereby the diameter range of the tool which corresponds to the difference between the maximum diameter and the minimum diameter of the conical portion 23 is substantially increased.

Other advantages of the deburring tube according to the invention reside therein, that it is possible to deburr tubes having different wall thickness without changing the tool proper, and in that this has no projecting, moveable parts in which the clothes of the operator may get caught during a deburring operation.

The embodiment described above and shown in the drawings is, of course, to be regarded merely as a non-limiting example and may as to its details be modified in several ways within the scope of the appended claims.

I claim:

1. A tool for deburring tubes of different width comprising means for securing the tool in a rotor machine; a holder connected to said tool securing means and holding a number of cutters located in grooves in said holder and having deburring edges, which face away from said tool securing means; and a guide stud, which is substantially coaxial with said holder and said tool securing means and comprises a substantially conical portion for centering the tube to become deburred with respect to said cutter holder, said conical portion facing away from said tool securing means, wherein said cutters and said guide stud are elastically movable with respect to each other under the influence of spring means.

2. Deburring tool according to claim 1, wherein said cutters are biased by springs for pressing said cutters against said guide stud.

3. Deburring tool according to claim 1, wherein said cutter grooves of the cutter holder are located in an end surface which is substantially perpendicular to the rotational axis of said rotor machine and faces away from said tool securing means, and said cutter holder is associated with a cap which substantially covers said end surface and is provided with a central opening for said guide stud.

4. Deburring tool according to claim 2, characterized by the provision of guide grooves for the guiding of the deburring edges of said cutters, said guide grooves being provided in the conical envelope surface of said guide stud, substantially opposite the grooves of said cutter holder and extending in the direction from the base of said conical portion toward its point.

5. Deburring tool according to claim 1, wherein said guide stud has a rear portion which is situated intermediate said conical portion of the guide stud and said tool securing means and is located in a substantially central dead end hole in said cutter holder, and said guide stud is biased away from said tool securing means by a spring which is provided between the bottom of said hole and that end of said guide stud which faces said hole bottom.

6. Deburring tool according to claim 1, wherein each cutter has deburring edges for inside and outside deburring as well as smoothing of the end surface of a tubular member.

7. Deburring tool according to claim 1, wherein the position of the guide stud in the axial direction with respect to said cutter holder is adjustable beforehand.

* * * * *